United States Patent [19]

Walton

[11] Patent Number: 4,888,474
[45] Date of Patent: Dec. 19, 1989

[54] PROXIMITY IDENTIFICATION SYSTEM WITH LATERAL FLUX MAGNETIC ROD COUPLING

[76] Inventor: Charles A. Walton, 19115 Overlook Rd., Los Gatos, Calif. 95030

[21] Appl. No.: 203,944

[22] Filed: Jun. 8, 1988

[51] Int. Cl.$^4$ ............................................. G06K 7/68
[52] U.S. Cl. ..................................... 235/449; 235/380
[58] Field of Search ................ 340/941; 235/449, 380; 364/424.02

[56] References Cited

U.S. PATENT DOCUMENTS 4,630,044  12/1986  Polzer ................................. 340/941
4,729,449   3/1988  Holmquist ....................... 364/424.02

Primary Examiner—Harold I. Pitts
Attorney, Agent, or Firm—Thomas E. Schatzel

[57] ABSTRACT

A reader section has an oscillator for providing a power signal to a reader antenna. The reader antenna is constructed of a ferromagentic rod having primary and secondary windings. The primary windings are concentrated near the end of the ferromagnetic rod. A transformer is connected to the oscillator and the reader antenna and separates the power signal from an identifier signal. An identifier section has an identifier antenna which is constructed of a ferromagnetic rod having wire windings. An identifier circuit is connected to the identifier antenna for receiving the power signal and for transmitting a unique identifier signal.

31 Claims, 6 Drawing Sheets

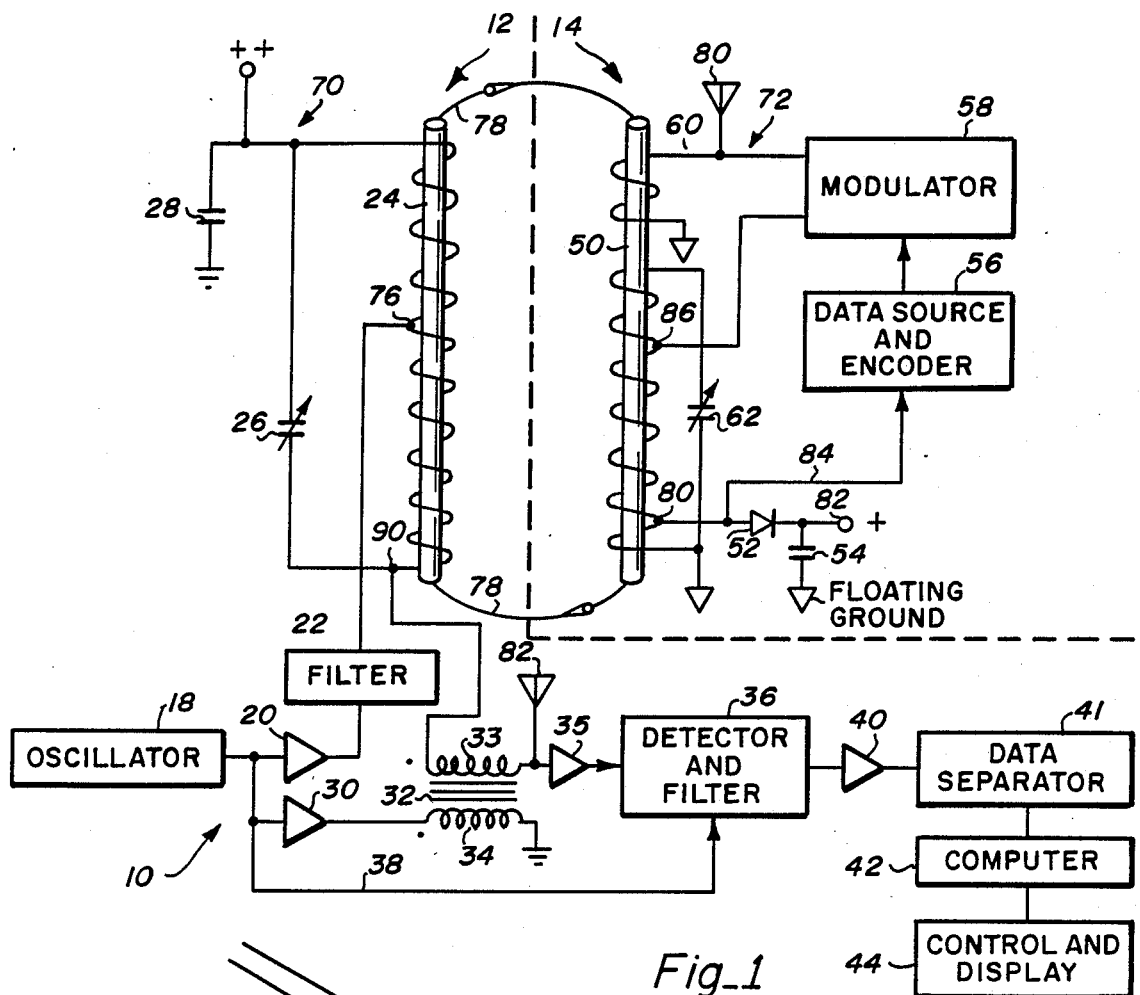
*Fig_1*
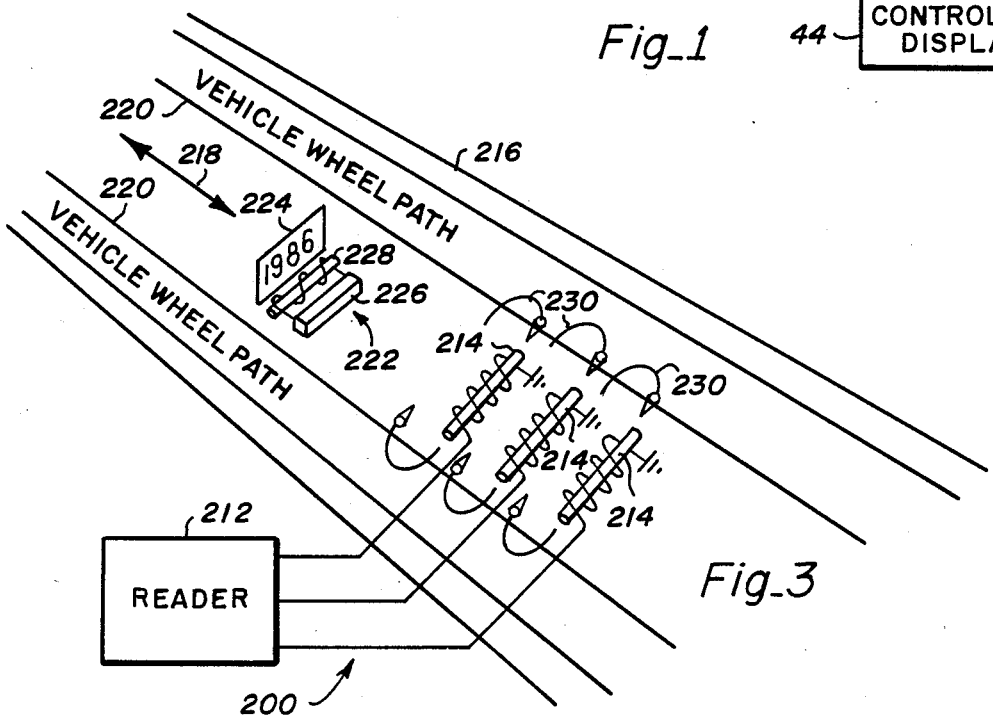
*Fig_3*

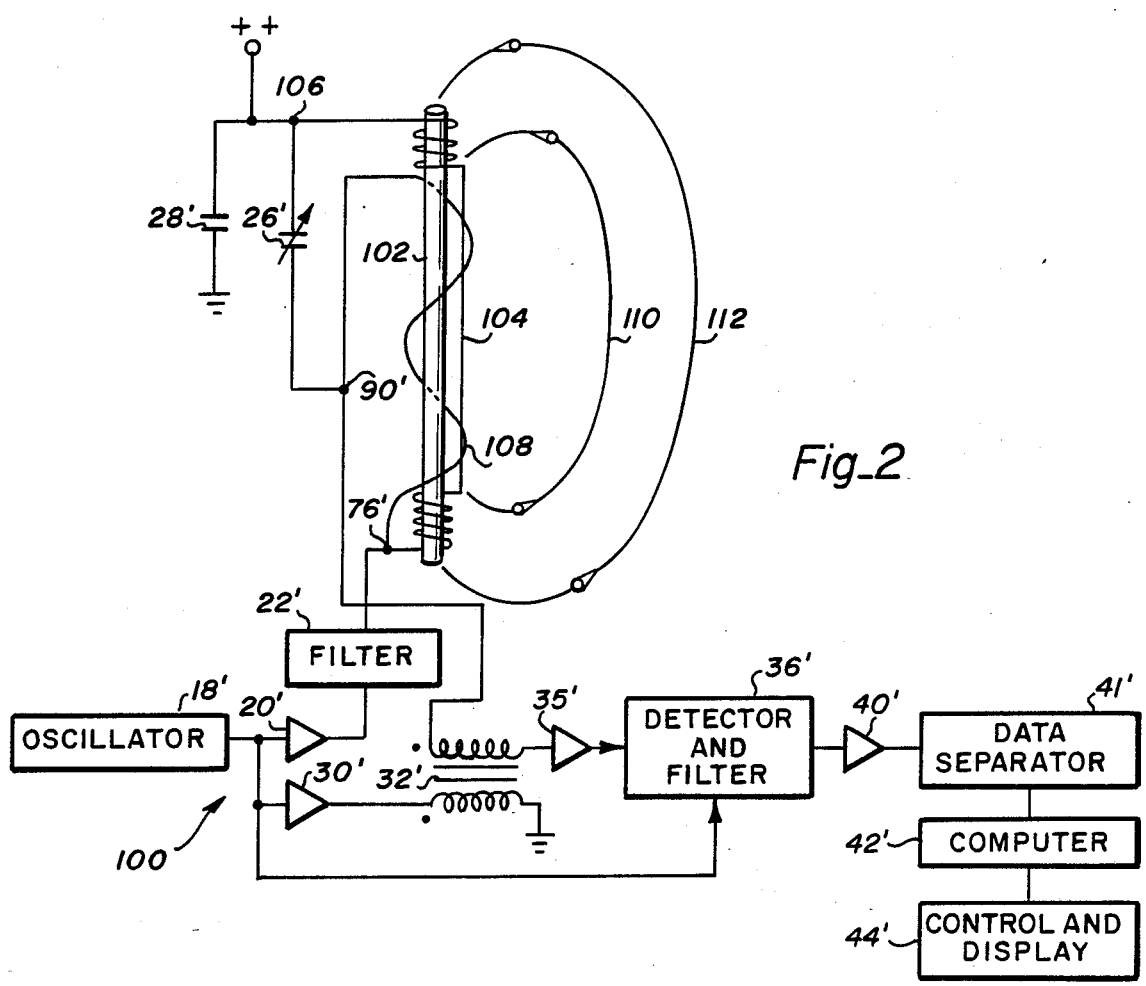
Fig_2
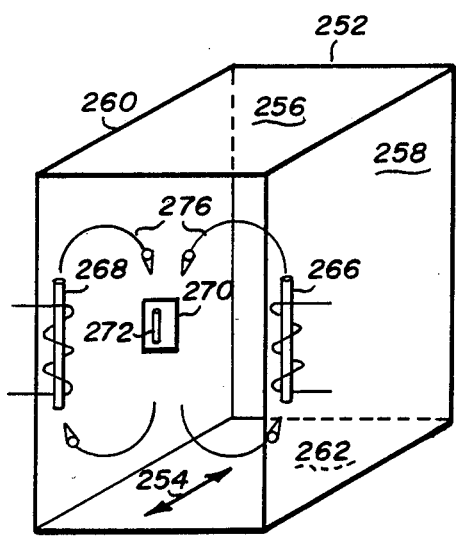
Fig_4
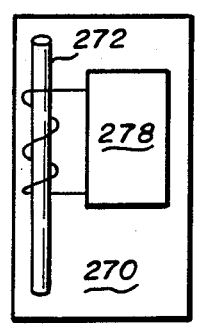
Fig_5
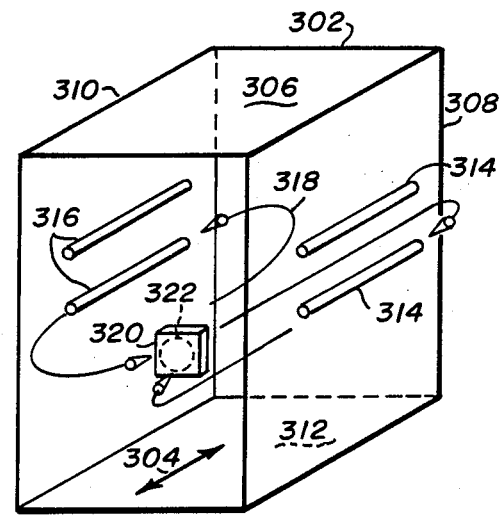
Fig_6

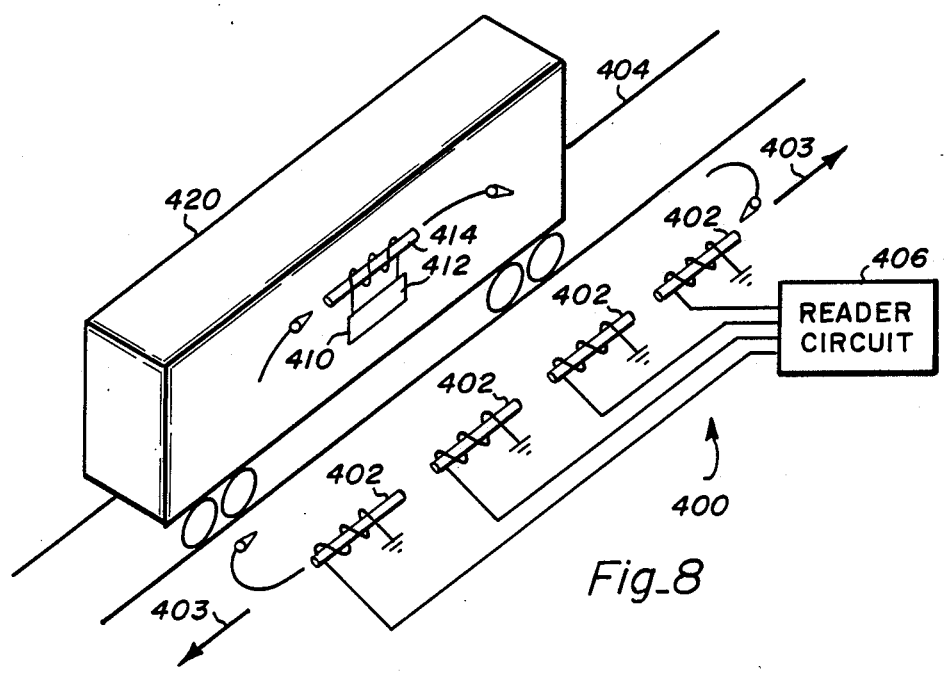
Fig_8
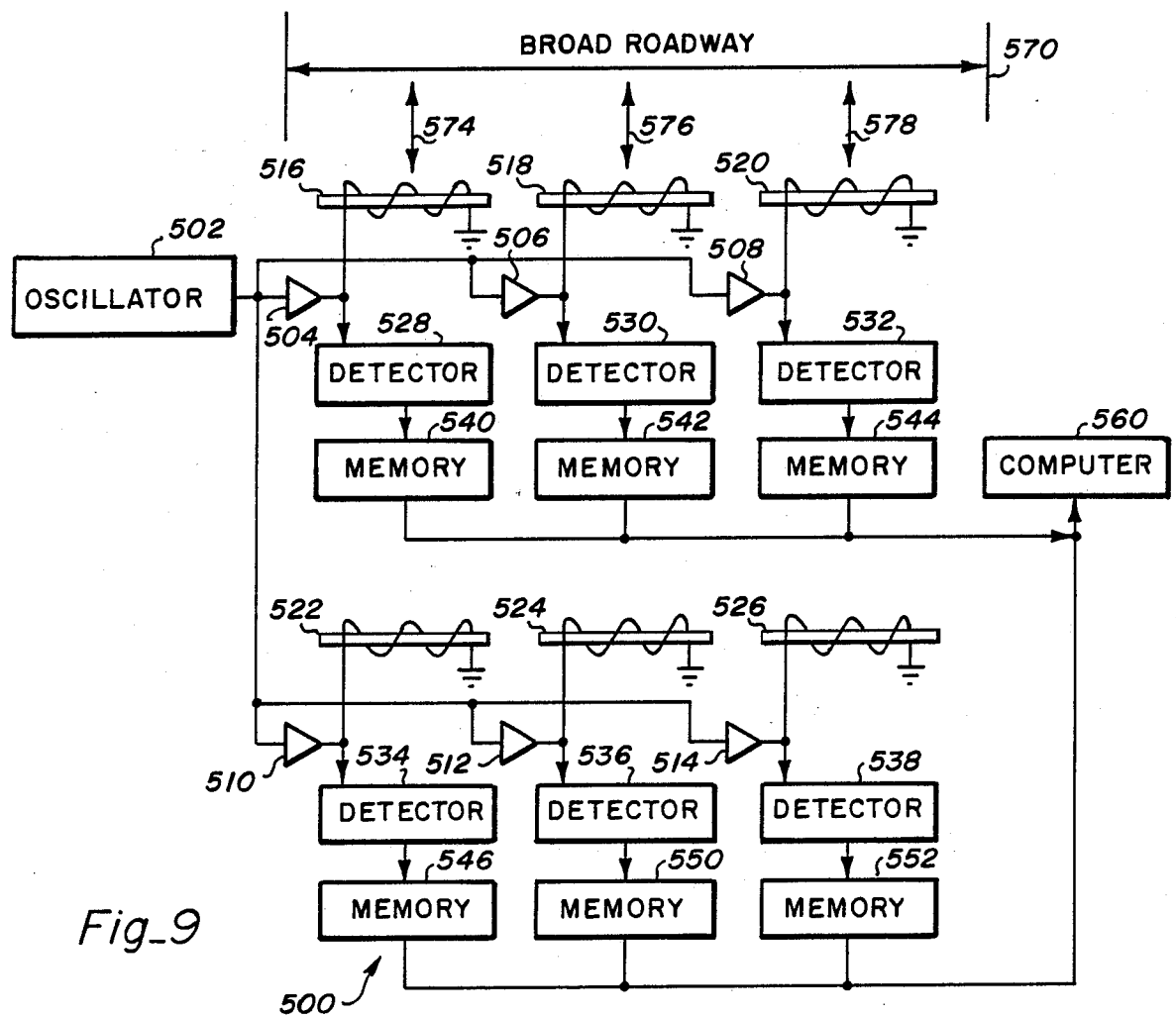
Fig_9

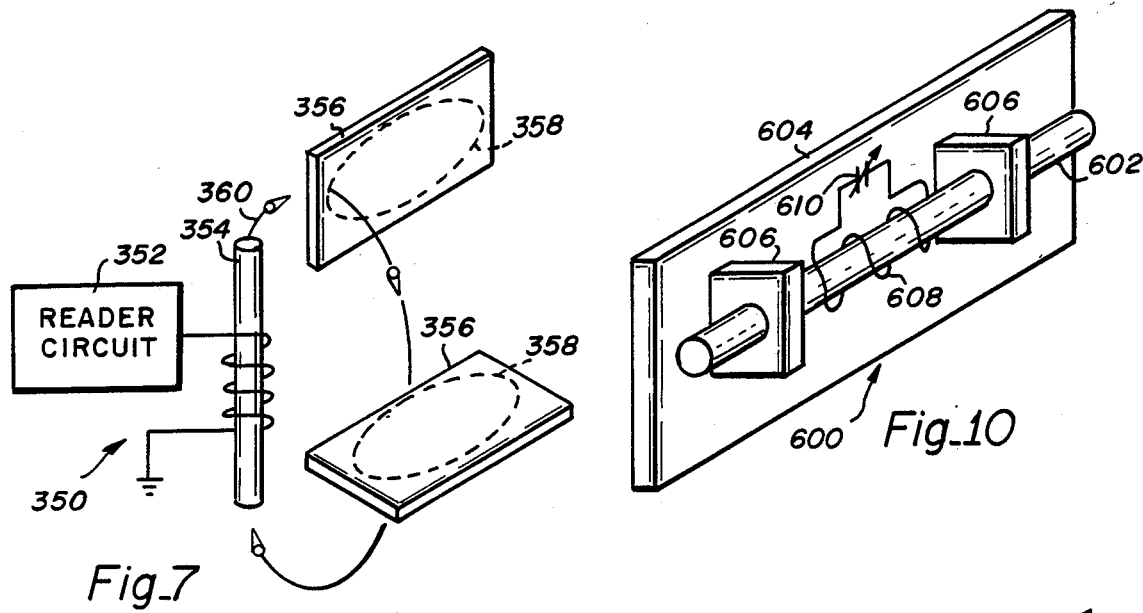
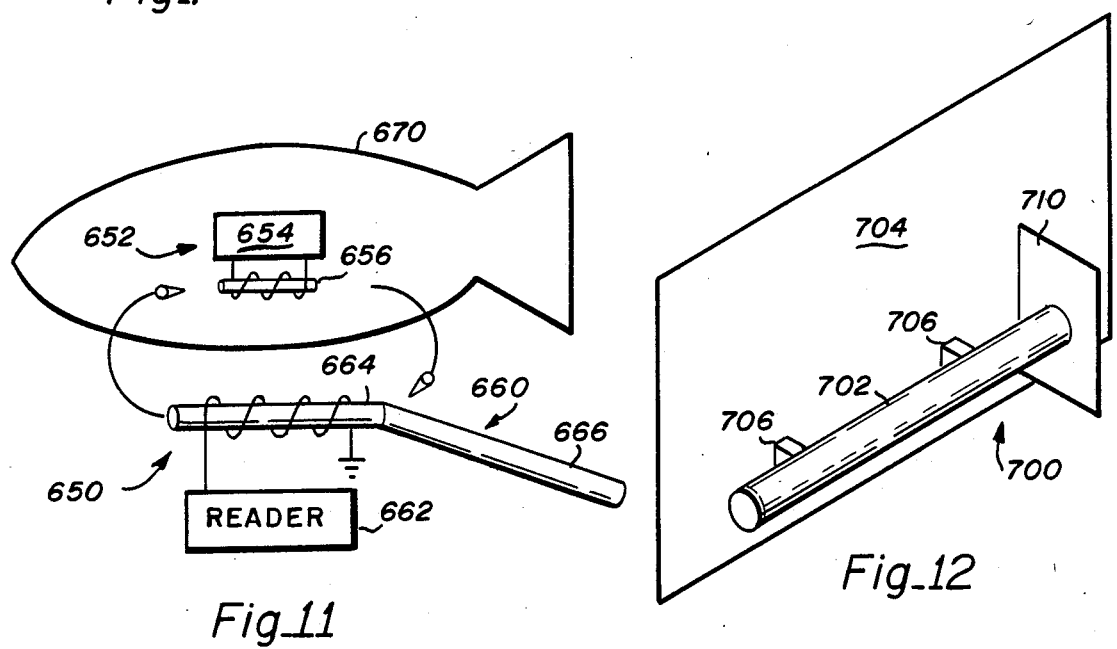
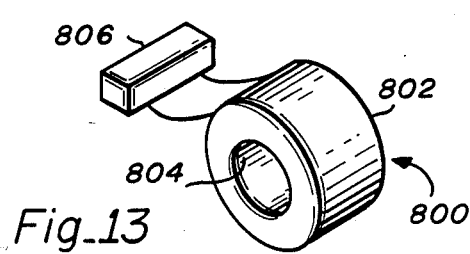

PROXIMITY IDENTIFICATION SYSTEM WITH LATERAL FLUX MAGNETIC ROD COUPLING

BACKGROUND OF THE INVENTION

1. Field of the Invention

This invention relates generally to electronic identification and recognition systems and more specifically to such systems wherein it is not necessary to make physical contact between the identification section and the reader section.

2. Description of the Prior Art

There are various electronic identification and recognition systems wherein the identifying device is portable. Sometimes the identifying device is referred to as a "card", "tag", "key", or the like. The recognition station or reader section is prepared to recognize identifying devices of predetermined characteristics when such identifying device is brought within the proximity of the reader section. One method used for proximity identification is by high frequency radio signals. These radio signals at 915 megahertz or 2.4 gigahertz can be identified by reflection and selective absorption methods. Problems with this approach include the cost of circuits and antennas, possible health hazards at the higher frequency, and null spots at intermediate distances. A second method for proximity identification is by inductive coupling. Here the inductive flux lines radiate from a coil or loop antenna in a reader section to a similarly shaped loop in the identification section. A problem with this method is that if the object to be identified includes a metal surface or metal walls, the flux path is attenuated and the range is reduced. Another problem with inductive coupling of the prior art is that the loop antennas tend to be quite large and bulky.

The prior art includes various patents and patent applications by the present inventor. The patents include U.S. Pat. No. 3,752,960 for "Electronic Identification and Recognition System", issued Aug. 14, 1973; U.S. Pat. No. 3,816,708 for "Electronic Recognition and Identification System", issued June 11, 1974; U.S. Pat. No. 3,816,709 for "Electronic Identification and Recognition System", issued June 11, 1974; U.S. Pat. No. 4,223,830 for "Identification System", issued Sept. 23, 1980; U.S. Pat. No. 4,236,068 for "Personal Identification and Signalling System", issued Nov. 25, 1980; U.S. Pat. No. 4,384,288 for "Portable Radio Frequency Emitting Identifier", issued May 17, 1983; U.S. Pat. No. 4,388,524 for "Electronic Identification and Recognition With Code Changeable Reactance", issued June 14, 1983; U.S. Pat. No. 4,459,474 for "Identification System With Separation and Direction Capability and Improved Noise Reduction", issued July 10, 1984; U.S. Pat. No. 4,473,825 for "Electronic Identification System With Power Input-Output Interlock and Increased Capabilities", issued Sept. 25, 1988; U.S. Pat. No. 4,546,241 for "Electronic Proximity Identification Systems", issued Oct. 8, 1985; U.S. Pat. No. 4,580,041 for "Electronic Proximity Identification System With Low Power Identifier, Simplified", issued Apr. 1, 1986; U.S. Pat. No. 4,600,829 for "Electronic Proximity Identification and Recognition System With Isolated Two-Way Coupling", issued July 15, 1986; U.S. Pat. No. 4,654,658 for "Identification System With Vector Phase Angle Detection", issued Mar. 31, 1987; and U.S. Pat. No. 4,656,472 for "Proximity Identification System With Power Aided Identifier", issued Apr. 7, 1987. In addition, there is currently pending a U.S. patent application Ser. No. 06/892,120 for "Proximity Identification System With Lateral Flux Paths", filed Aug. 4, 1986.

SUMMARY OF THE PRESENT INVENTION

It is therefore an object of the present invention to provide an electronic proximity identification system with improved range.

It is another object of the present invention to provide an electronic proximity identification system of reduced size and cost.

It is another object of the present invention to provide an electronic proximity identification system which is tolerant of adjoining metal surfaces.

It is another object of the present invention to provide a system wherein both reader and identifier sections are easy to install.

Briefly, in a preferred embodiment, the present invention includes a reader section and an identifier section. The reader section comprises an oscillator for providing a power signal. A reader antenna is constructed of a ferromagnetic rod having wire windings and is connected to the oscillator for radiating a power signal and for receiving an identifier signal. The reader antenna has primary and secondary windings with the primary windings concentrated at either end of the ferromagnetic rod. A transformer is connected to the reader antenna and the oscillator for screening out the power signal from the identifier signal. A recognition circuit is connected to the transformer for recognizing the identifier signal.

The identifier section comprises an identifier antenna for receiving the power signal and for radiating the identifier signal. The identifier antenna is comprised of a ferromagnetic rod having wire windings. An identifier circuit is connected to the identifier antenna and provides an identifier signal to the identifier antenna responsive to reception of the power signal.

It is an advantage of the present invention in that it provides a proximity identification system having improved range.

It is another advantage of the present invention in that it provides a proximity identification system of reduced size and cost.

It is another advantage of the present invention in that it provides a proximity identification system that is tolerant of adjoining metal surfaces.

It is another advantage of the present invention in that it provides a system wherein the reader and identifier sections are easy to install.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 shows a block diagram of the proximity identification system of the present invention;

FIG. 2 shows a block diagram of an alternative embodiment of the reader section;

FIG. 3 shows a perspective view of a proximity identification system of the present invention for identifying vehicles;

FIG. 4 shows a perspective view of a proximity identification system of the present invention for walk through identification of individuals;

FIG. 5 shows a front view of a badge of the system of FIG. 4;

FIG. 6 shows a perspective view of another embodiment of the proximity identification system of the present invention for walk through identification of individuals;

FIG. 7 shows a perspective view of another embodiment of the proximity identification system of the present invention for card identification of individuals;

FIG. 8 shows a perspective view of a proximity identification system of the present invention for identifying railroad freight cars;

FIG. 9 shows a block diagram of another embodiment of the proximity identification system of the present invention for use with wide roadways;

FIG. 10 shows a perspective view of another embodiment of the antennas of the present invention;

FIG. 11 shows a side elevational view of another embodiment of the present invention for use with identifying animals;

FIG. 12 shows a perspective view of another embodiment of the present invention which teaches a removable identifier circuit; and FIG. 13 shows a perspective view of another embodiment of the present invention and teaches a removable identifier section.

DETAILED DESCRIPTION OF THE PREFERRED EMBODIMENT

FIG. 1 shows a circuit diagram of a proximity identification system of the present invention and is designated by the general reference number 10. System 10 comprises a reader section 12 and an identifier section 14.

The reader section 12 has an oscillator 18 connected to an amplifier 20. A filter 22 is connected between amplifier 20 and a reader antenna 24. Reader antenna 24 is constructed of a ferromagnetic rod having wire windings. Ferrite may be used as the ferromagnetic material. A variable capacitor 26 is connected in parallel with antenna 24. A capacitor 28 is connected to variable capacitor 26.

An amplifier 30 is connected to oscillator 18. A transformer 32 has a secondary winding 33 connected to reader antenna 24 and a primary winding 34 connected to amplifier 30. An amplifier 35 is connected to the secondary winding 33 of transformer 32. A detector and filter circuit 36 is connected to amplifier 35. Various types of detector circuits are shown in the referenced patents. Amplitude or phase detectors are both suitable. If phase detection is used, a line 38 connects oscillator 18 and detector and filter 36. An amplifier 40 is connected to detector and filter 36 and a data separator 41 is connected to amplifier 40. A computer 42 is connected to data separator 41. A control and display 44 is connected to computer 42.

The identifier section 14 is comprised of an identifier antenna 50. Antenna 50 is also constructed of a ferromagnetic rod having wire windings. The ferromagnetic material may be ferrite. A diode 52 is connected to antenna 50. A capacitor 54 is connected between diode 52 and ground. A data source and encoder 56 is connected to antenna 50. Data source and encoder 56 are described in some of the referenced patents. A modulator 58 is connected between the data source and encoder 56 and antenna 50. Several types of modulators may be used, such as phase modulation or amplitude modulation. Another method is to modulate a second frequency by means of a secondary winding 60 on antenna 50. A variable capacitor 62 is connected in parallel with the principal winding of antenna 50 and is used to tune the antenna 50.

All elements of the reader section 12, except for antenna 24, are referred to collectively as a reader circuit 70 and all elements of identifier section 14 except for antenna 50 are referred to as an identifier circuit 72.

In operation, oscillator 18 provides a frequency signal to amplifier 20 and filter 22. Filter 22 is used to limit harmonics and thereby satisfy Federal Communication Commission radiation requirements. Antenna 24 is tuned to the frequency of oscillator 18 with capacitor 26. The antenna 24 is tapped and driven at a fractional point 76 in order to increase the overall voltage swing across the antenna 24.

The reader antenna 24 is inductively coupled to the identifier antenna 50 by flux lines 78. Antenna 50 is tapped at a point 80. The diode 52 and capacitor 54 provide a DC power supply for the logic circuits of identifier 14 at a point 82.

The data source and encoder 56 provide a flow of identifier data to modulator 58. The clock for the data source 56 is generated internally or is taken from the carrier frequency via line 84. The modulator 58 modulates the inductive field by transmitting an identifier signal to a point 86 on antenna 50, or by transmitting the identifier signal to secondary winding 60. As stated above, several methods of modulation are possible and are described in the referenced patents.

The identifier signal is inductively coupled from identifier antenna 50 to reader antenna 24. At a point 90 of antenna 24, there is present a large voltage representing the power signal from oscillator 18 and a weak signal representing the identifier signal from the identifier section 14. The weak identifier signal is best amplified if the large power signal is suppressed. This suppression is achieved by cancelling it by adding an equal voltage of opposite polarity. Transformer 32 provides this cancelling voltage. The primary winding 34 of transformer 32 is driven by amplifier 30 at the same phase as the power signal at point 90. The secondary winding 33 is of opposite polarity as shown by the phasing dots and its voltage is added in series with the voltage from point 90. The drive voltage (power signal) is subtracted out and only the data signal (identifier signal) is present at amplifier 35. This signal is then amplified by amplifier 35 and the result is sent to the detector and filter 36 and amplifier 40. The data separator 41 decodes the identifier signal, which is then sent to computer 42. Computer 42 is then able to identify the particular identification section 14 by its unique identifier signal. Information relating to the particular identification section 14 is then called up on the computer and display 44 by the user of the system.

In the preferred embodiment of system 10, both the power signal and the identifier signal are inductively coupled between antennas 24 and 50. An option is to have the identifier signal sent by electric field radiation. A dipole antenna 80 may be connected between modulator 58 and winding 60 of identifier 14. Dipole antenna 80 is achieved by merely making a connection to the automobile chassis. Another dipole antenna 82 is connected between transformer 32 and amplifier 35. In operation, this optional embodiment would have a power signal sent by inductive coupling between antennas 24 and 50 and the identifier signal is sent by electric field radiation between antennas 80 and 82.

FIG. 2 shows a circuit diagram of an alternative embodiment of a reader section and is designated by the general reference number 100. Elements of reader section 100 which are similar to elements of reader section 12 of FIG. 1 are designated by a prime number.

A reader antenna 102 is comprised of a ferromagnetic rod having wire windings. A primary winding 104 is connected between point 76' and a point 106. Note that the turns of winding 104 are concentrated at both ends of antenna 102. There are no windings along the middle section of the rod. A secondary winding 108 is connected between point 76' and point 90'. Secondary winding 108 is connected to winding 104 to form a fully tuned circuit. In practice, winding 108 may also be concentrated at the end portions of rod antenna 102 and winding 108 may contain more turns than winding 104. The remaining portions of reader section 100 are similar to reader section 12 of FIG. 1.

In a ferromagnetic rod antenna where the windings are evenly distributed, a large percentage of the flux lines take a short cut route by leaving the center of the rod rather than the ends. This is illustrated by way of example with flux line 110 in FIG. 2. When this happens, some of the range of the reader is lost, since a lot of the flux lines do not pass through the full width of the sensing region.

This problem is solved by antenna 102 by means of concentrating the primary windings 104 at the ends of the rods. The magnetizing force from the current in the winding 104 is concentrated near the outer edges and the percentage of the flux lines exiting from the ends of the rod is maximized. This effectively increases the range of antenna 102. These improved flux lines are illustrated by a flux line 112.

The primary winding 104 and the secondary winding 108 give antenna 102 an auto transformer configuration. This configuration gives the antenna 102 additional drive power and range by effectively stepping up the voltage. The extra secondary winding 108 also helps to pick up the weak identifier signal from the identifier section.

FIG. 3 shows a perspective view of a proximity identification system of the present invention for identifying vehicles and is designated by the general reference number 200. A reader circuit 212 is connected to a plurality of reader antennas 214. The reader circuit 212 is configured as the reader circuit 70 of FIG. 1. The reader antennas 214 may be constructed similarly to reader antenna 24 of FIG. 1 or reader antenna 102 of FIG. 2. The reader antennas 214 are mounted within a road bed 216 and oriented with their axis perpendicular to a vehicle line of travel 218. The reader antennas 214 are sized to fit within the vehicle wheel paths 220 of a passing vehicle.

An identifier section 222 is shown mounted to a license plate 224. This license plate 224 would be the license plate of a passing vehicle, which is not shown. The identifier section 222 is comprised of an identifier antenna 228 and an identifier circuit 226. The identifier section 222 may be constructed in a similar manner as identifier section 14 of FIG. 1. The identifier antenna 228 is mounted on license plate 224 such that the axis of identifier antenna 228 is parallel with the axis of the reader antennas 214.

The reader antennas 214 are excited in phase by reader circuit 212. This causes the reader antennas 214 to produce an inductive flux flow 230 in a lateral and horizontal direction across the road bed 216. The reader antenna 228 of the identifier section 222 from a passing vehicle is then inductively coupled to the reader antenna 214. The identifier section 222 receives power from the reader antennas 214 and in return sends an identifier signal. The identity of the vehicle may then be determined by the reader circuit 212.

The number of reader antennas 214 needed is determined by the speed at which the vehicles are allowed to pass. High speeds require more reader antennas 214. Sensing a vehicle passing at a speed of fifteen miles per hour can be achieved with only two reader antennas 214.

Using ferromagnetic rod antennas in the identifier section has several advantages. Prior systems use loop or coil antennas in the identifier section. This made the identifier sections bulky and hard to mount. For inductive coupling with a loop antenna the flux lines had to pass through the loop loop. Due to interference problems, it was not practical to mount a loop antenna flush next to a metal object such as the car underbody or a license plate. The rod identifier antennas of the present invention receive inductive flux lines along its axis. This allows the antenna to be mounted flush against a metal object such as a license plate without undue interference. Mounting the identifier section flush against the license plate provides less chance of damage and makes installation much easier.

The use of ferromagnetic rod antennas in the reader section provides several advantages in identifying vehicles. The ferromagnetic rod reader antennas provide much better range and reception as compared to the loop antennas of the prior art. The rod type antennas are also much more compact than the loop antennas. This allows the rod type reader antennas to be mounted directly on the road bed between the wheel paths of the oncoming vehicles. This is much less costly than the loop antennas of the prior art which require much more space.

Prior art systems used loop antennas for the reader antenna. The loop antennas had problems where there was a reinforcing bar in the road bed. The reinforcing bar acted to short circuit the antennas. The rod antennas of the present invention overcome this problem.

FIG. 4 shows a perspective view of a proximity identification system for walk through identification of individuals and is designated by the general reference number 250. The system 250 is designed for use in identifying individuals who pass through a passageway 252 on a direction line 254. Passageway 252 has a top 256, a right wall 258, a left wall 260 and a floor 262. A reader antenna 266 is mounted to the right wall 258 and a reader antenna 268 is mounted to the left wall 260. Both antenna 266 and 268 may be constructed similarly to antenna 24 of FIG. 1 or antenna 102 of FIG. 2. The antenna 266 and 268 are shown oriented such that their longitudinal axis are in the vertical direction. The antenna 266 and 268 are connected to a reader circuit which is not shown.

An individual travelling through passageway 252 on direction line 254 wears identifier badge 270. The badge 270 contains an identifier antenna 272 and an identifier circuit which is not shown. Antenna 272 is oriented on badge 270 such that its longitudinal axis is in the vertical direction and inductively couples with the reader antennas 266 and 268 via a plurality of vertical flux lines 276.

FIG. 5 shows badge 270 of FIG. 4 in more detail. The badge 270 has the identifier antenna 272 connected to an identifier circuit 278. Identifier antenna 272 and identifier circuit 278 may be constructed similarly to identifier section 14 of FIG. 1. The badge 270 may be constructed as a clip on type identification badge.

FIG. 6 shows a perspective view of an alternative embodiment of a proximity identification system for walk through identification of individuals and is designated by the general reference number 300. System 300 is designed for use in identifying individuals who pass through a passageway 302 on a line of direction 304. Passageway 302 has a top 306, a right wall 308, a left wall 310 and a floor 312. A pair of reader antennas 314 are mounted to the right wall 308, with their longitudinal axis located in a horizontal direction. A pair of reader antennas 316 are mounted to the left wall 310 with their longitudinal axis located in a horizontal direction. The reader antennas 314 and 316 may be constructed similarly to reader antenna 24 of FIG. 1 or reader antenna 102 of FIG. 2. The reader antennas 314 and 316 are all connected to a reader circuit, not shown, which may be similar to reader circuit 70 in FIG. 1. The reader circuit energizes the antennas 314 and 316 in phase, thus creating a flux field having flux lines 318 in the horizontal direction, parallel to direction line 304.

A badge identifier section 320 contains a loop antenna 322 and an identifier circuit which is not shown. The loop antenna 322 is inductively coupled to antennas 314 and 316 when an individual carries the badge 320 through the passageway 302. The system 300 can also be designed with only one reader antenna on each wall, however, two or more reader antennas on each wall ensure that badge 320 will be read even when carried through passageway 302 at a variety of different elevations.

FIG. 7 shows a perspective view of another embodiment of the proximity identification of the present invention and is designated by the general reference number 350. System 350 is used as a card reader. A reader circuit 352 is connected to a reader antenna 354. Reader circuit 352 may be constructed similarly to reader circuit 70 of FIG. 1 and reader antenna 354 may be constructed similar to reader antenna 24 of FIG. 1 or reader antenna 102 of FIG. 2. The longitudinal axis of reader antenna 354 may be positioned either vertically or horizontally on a wall.

An identifier badge or card 356 contains a loop antenna 358 and an identifier circuit, not shown. The card 356 is placed near the reader antenna 354 in such a manner as to intersect the flux lines 360. The reader antenna 354 is much smaller than a typical loop antenna used in prior art systems and allows for a more compact system. Antenna 354 may, for example, be mounted in a door jam or door mullion. The identifier badge 356 may be constructed similarly to loop identifier systems of the referenced prior art.

FIG. 8 shows a perspective view of a proximity identification system for use with railroad freight cars and is designated by the general reference number 400. A plurality of reader antennas 402 are arranged with their longitudinal axis located along a line 403 which is parallel to railroad tracks 404. The antennas 402 are connected to a reader circuit 406. Reader circuit 406 may be constructed similarly to reader circuit 70 of FIG. 1 and reader antenna 402 may be constructed similar to reader antenna 24 of FIG. 1 or reader antenna 102 of FIG. 2.

An identifier section 410 is comprised of an identifier circuit 412 and an identifier antenna 414. The identifier section 410 is attached to a railroad car 420 such that antenna 414 has its longitudinal axis parallel with the railroad tracks 404. Identifier section 410 may be constructed similarly to identifier section 14 of FIG. 1. When the car 420 passes, the reader antennas 402 and the identifier antenna 414 are inductively coupled.

The reader antennas 402 are shown positioned beside railroad tracks 404, but they could also be located underneath the tracks. Identifier section 410 would then be attached below car 420. In practice, the low cost of the reader section makes it practical to mount reader antennas 402 on both sides of the railroad tracks as well as underneath them, if desired.

FIG. 9 shows a block diagram of a proximity identification system for use with broad roadways and is designated by the general reference number 500. System 500 comprises a crystal oscillator 502. Oscillator 502 is connected to a plurality of drive amplifiers 504, 506, 508, 510, 512 and 514 which are in turn connected to rod antennas 516, 518, 520, 522, 524 and 526, respectively. Rod antennas 516–526 may be constructed similar to antenna 24 of FIG. 1 or antenna 102 of FIG. 2. Antennas 516–526 are connected to a plurality of detector circuits 528, 530, 532, 534, 536 and 538, respectively. The detection circuits 528–538 are in turn connected to a plurality of short term logic memory blocks 540, 542, 544, 546, 550 and 552, respectively. Memory blocks 540–552 are each connected to a computer 560.

Antennas 516–526 are mounted in a plane which is parallel to and located beneath a roadway bed 570. Roadway 570 has a plurality of lanes for vehicles and a plurality of direction lines 574, 576 and 578 are shown. The antennas 516–526 are positioned with their longitudinal axis perpendicular to lines 574–578.

System 500 may be used for a multi-lane highway or at the entrance or exit of a multi-lane maintenance shop. Each vehicle would have an identifier section such as shown in FIG. 3. Antennas 516–526 are all excited in phase by oscillator 502, so that each of the individual radiated fields does not adversely interact. When a vehicle passes over one of antennas 516–526, the vehicle identification signal is detected and stored by the detector and memory block associated with that particular antenna.

Computer 560 continuously polls and accepts the identifier data values from the memory blocks 540–552. The memory blocks 540–552 are reset after reading. In the event that a vehicle is identified by more than one antenna, the computer is programmed to reject the redundant information. With multiple antennas 516–526 and their associated detectors and memory blocks, it is also possible, if the millisecond time value is recorded, to determine and record the direction of travel of the vehicle. For example, a vehicle travelling along 574 from top to bottom, would have its identifier signal read and stored in memory 540 before it is also read and stored in memory 546.

FIG. 10 shows a perspective view of an alternative embodiment of an antenna for use in a proximity identification system of the present invention and is designated by the general reference number 600. Antenna 600 is comprised of a ferromagnetic rod 602. Ferrite may be used as the ferromagnetic material. The rod 602 is wrapped with wire windings 606 and connected to a variable capacitor 610. The rod 602 is mounted to a metal backing plate 604 by means of a plurality of insulating brackets 606. The brackets 606 hold rods 602 a short distance away from plate 604.

In proximity identification systems, the reader or identifier antenna is typically tuned to the carrier frequency by means of a variable capacitor such as capacitor 26 of FIG. 1. The presence or absence of a metal object close to the antenna will change the tuning value. This necessitates tuning the antenna after it has been installed. Antenna 600 solves this problem. The antenna 600 already has a metal sheet 604 in close proximity to it. Antenna 600 may be tuned by means of variable capacitor 610 prior to installation. Antenna 600 may then be installed next to a large metal object such as the underside of a vehicle, without any further tuning necessary.

FIG. 11 shows an alternative embodiment of the present invention for use with tracking and identifying animals and is designated by the general reference number 650. An identifier section 652 is comprised of an identifier circuit 654 which is connected to a ferromagnetic rod identifier antenna 656. A reader section 660 is comprised of a reader circuit 662 connected to a ferromagnetic rod reader antenna 664. Antenna 664 is connected to a nonferrous handle 666.

In operation, the animal subject to be tracked and identified is tagged with the identifier section 652. For purposes of illustration, identifier section 652 is shown attached to a fish 670. A user could identify the fish by holding the reader section 660 by the handle 666 and position it proximate the fish 670.

FIG. 12 shows an alternative embodiment of the present invention and is designated by the general reference number 700. A ferromagnetic rod 702 is connected to a license plate 704 by attachment member 706. Attachment member 706 ensures that the rod 702 is mounted a small distance away from the surface of license plate 704. An identifier card 710 is similar to card 356 of FIG. 7 and also has an embedded loop antenna within it. Card 710 may be attached to either end of rod 702. The attachment means, not shown, would allow the card 710 to be easily removed.

In operation, the user would place his card as shown next to rod 706 on license plate 704. When the vehicle containing the license plate 704 drives past a reader section, the flux lines from the reader section would be concentrated by the rod 702. These concentrated flux lines would then pass through the loop antenna within card 710 and energize the card and allow the card to send an identifier signal. Once the vehicle reached its destination, the user could easily remove the card 710.

The advantages of this embodiment are several. First, when card 710 is removed, no person can determine the vehicle code as the car sits idly in a parking lot. Secondly, the card 710 can be carried in the wallet and used for personal identification in access to an office as shown in FIG. 7. Thirdly, a code value can be easily changed by issuing a new card.

FIG. 13 shows a portable donut-shaped identifier and is designated by the general reference number 800. A number of wire turns are mounted within a donut-shaped housing 802. Housing 802 has a middle hole 804 which is sized such that housing 802 can slide over the end of rod 702 as shown in FIG. 12. An identifier circuit 806 is connected to the wire turns of housing 802.

In operation, identifier 800 is similar to card 710 of FIG. 12. Identifier 800 is positioned on rod 702 such that rod 702 passes though hole 804. Flux lines from a reader section are concentrated by rod 702 and are received by the wire turns in identifier 800. Identifier 800 may be easily removed from the vehicle when the vehicle is no longer in operation.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A proximity identification system comprising:
   a reader section having a reader circuit connected to a reader antenna, said reader circuit for supplying a power signal and for detecting an identifier signal, said reader antenna for inductively coupling with an identifier antenna for transmitting said power signal to said identifier antenna and for receiving said identifier signal from said identifier antenna, said reader antenna comprised of a ferromagnetic rod having wire windings; and
   an identifier section having an identifier circuit connected to an identifier antenna, said identifier circuit for generating said identifier signal responsive to said power signal.

2. The system of claim 1 wherein,
   said identifier antenna is comprised of a ferromagnetic rod having wire windings.

3. The system of claim 2 wherein,
   said identifier antenna further comprises a metal plate connected to said rod by means of insulating brackets.

4. The system of claim 1 wherein,
   said reader antenna further comprises a metal plate connected to said rod by means of insulating brackets.

5. The system of claim 1 wherein,
   said reader circuit further comprises an oscillator connected to said reader antenna for providing said electrical power and a transformer connected to said oscillator and said reader antenna for subtracting said electrical power signal from said identifier signal.

6. The system of claim 1 wherein,
   said wire windings are concentrated proximate both end portions of said ferromagnetic rod.

7. The system of claim 1 wherein,
   said ferromagnetic rod has a primary wire winding and a secondary wire winding.

8. The system of claim 1 wherein,
   said reader antenna comprises a plurality of ferromagnetic rods having wire windings, each of said ferromagnetic rods having a longitudinal axis and each ferromagnetic rod being oriented with parallel axis.

9. The system of claim 1 wherein,
   said reader antenna further comprises a dipole antenna and said identifier antenna further comprises a dipole antenna.

10. The system of claim 9 wherein,
    said identifier dipole antenna comprises a vehicle chassis.

11. The system of claim 1 wherein,
    said identifier antenna is attached to a vehicle license plate.

12. The system of claim 1 wherein, the identifier section is attached to an animal to be identified.

13. The system of claim 1 wherein,
the identifier section is mounted in a card, said identifier antenna is a loop antenna, and the identifier section is mounted at the end of a ferromagnetic rod attached to a vehicle.

14. The system of claim 1 wherein,
the identifier section is mounted in a housing, said identifier antenna is comprised of wire turns, and said housing is shaped to fit around a ferromagnetic rod attached to a vehicle.

15. A proximity identification system comprising:
a reader section comprising an oscillator for providing a power signal, a reader antenna connected to said oscillator comprised of a ferromagnetic rod having wire windings for inductively coupling with an identifier antenna for radiating said power signal to said identifier antenna and for receiving an identifier signal from said identifier antenna, a recognition means connected to said reader antenna for recognizing said identifier signal; and
an identifier section comprising an identifier antenna for receiving said power signal and radiating said identifier signal, said identifier antenna comprised of a ferromagnetic rod having wire windings, and an identifier circuit connected to said identifier antenna for providing said identifier signal responsive to said power signal.

16. The system of claim 15 wherein,
said recognition means comprises a transformer connected to said oscillator and said reader antenna for subtracting said power signal from said identifier signal.

17. The system of claim 15 wherein,
said wire windings of said reader antenna are concentrated proximate both end portions of said ferromagnetic rod.

18. The system of claim 15 wherein,
said ferromagnetic rod of said reader antenna has a primary wire winding and a secondary wire winding.

19. The system of claim 15 wherein,
said reader antenna is comprised of a plurality of ferromagnetic rods each having its own set of wire windings, each ferromagnetic rod having a longitudinal axis, all ferromagnetic rods oriented with their longitudinal axis parallel.

20. The system of claim 19 wherein,
said reader antennas are mounted proximate a vehicle path and said identifier section is mounted to a vehicle.

21. The system of claim 19 wherein,
said reader antennas are mounted within a passageway and said identifier section is mounted to a badge.

22. The system of claim 15 wherein,
said reader antenna further comprises a dipole antenna and said identifier antenna further comprises a dipole antenna.

23. The system of claim 22 wherein,
said identifier dipole antenna comprises a vehicle chassis.

24. The system of claim 15 wherein,
said identifier antenna is attached to a vehicle license plate.

25. The system of claim 15 wherein,
the identifier section is attached to an animal to be identified.

26. A proximity identification system comprising:
a reader section comprising an oscillator for providing a power signal, a reader antenna connected to said oscillator comprised of a ferromagnetic rod having wire windings for inductively coupling with an identifier antenna for radiating said power signal to said identifier antenna and for receiving an identifier signal from said identifier antenna, a recognition means connected to said reader antenna for recognizing said identifier signal and;
an identifier section comprising an identifier antenna for receiving said power signal and radiating said identifier signal, said identifier antenna is a loop antenna, and an identifier circuit connected to said identifier antenna for providing said identifier signal responsive to said power signal.

27. The system of claim 26 wherein,
said recognition means comprises a transformer connected to said oscillator and said reader antenna for subtracting said power signal from said identifier signal.

28. The system of claim 26 wherein,
said reader antenna is comprised of a plurality of ferromagnetic rods each having its own set of wire windings, each ferromagnetic rod having a longitudinal axis, all ferromagnetic rods oriented with their longitudinal axis parallel.

29. The system of claim 26 wherein,
said reader antennas are mounted proximate a vehicle path and said identifier section is mounted to a vehicle.

30. The system of claim 26 wherein,
said reader antennas are mounted within a passageway and said identifier section is mounted to a badge.

31. A proximity identification system comprising:
a reader section having an oscillator for providing a power signal, a plurality of amplifiers connected to said oscillator, a plurality of reader antennas for inductively coupling with an identifier antenna for radiating said power signal to said identifier antenna and for receiving an identifier signal from said identifier antenna, each reader antenna connected to one of said amplifiers, said reader antenna each comprised of a ferromagnetic rod having wire windings, a plurality recognition means, each connected to one of said reader antennas for recognizing said identifier signal received by the reader antenna to which that recognition means is connected and a plurality of memory storage means, each memory storage means connected to one of said recognition means for storing information contained in said identifier signal recognized by the recognition means to which that memory storage means is connected; and
an identifier section comprising an identifier circuit connected to an identifier antenna, said identifier circuit for providing said identifier signal responsive to said power signal.

* * * * *